United States Patent Office 3,036,957
Patented May 29, 1962

3,036,957
WATER SOLUBLE COMPOSITION OF LIPOID SOLUBLE VITAMINS
Robert A. Lehman, New York, N.Y., assignor to Campbell Pharmaceuticals, Inc., New York, N.Y., a corporation of Delaware
No Drawing. Filed Nov. 5, 1957, Ser. No. 694,485
9 Claims. (Cl. 167—81)

This invention relates to water- and aqueous glycerol-soluble compositions of lipoid soluble vitamins, to the solutions produced therefrom, and to method of making aqueous solutions of lipoid soluble vitamins.

An object of the invention is the provision of clear, stable, non-toxic aqueous solutions of lipoid soluble vitamins.

Another object of the invention is to provide compositions of lipoid soluble vitamins which may be dissolved in water or aqueous glycerol to give clear, stable solutions of high vitamin concentration which may be diluted to any extent without separating or clouding.

I have found that lipoid soluble vitamins, such as vitamins A and D, may be rendered soluble in water and aqueous glycerol solutions by the addition thereto of at least 6 parts by weight to each part of vitamin of a mixture of a monoester of a polyethylene glycol the glycol moiety of which has a molecular weight of about 400, selected from the group consisting of the laurate, coconate and oleate esters, and a water-insoluble, predominantly lipophilic, non-ionic surfactant in the range of from about ½ part to about 5 parts by weight of the surfactant to 10 parts of the polyethylene glycol monoester.

The lipoid soluble vitamins of the compositions of the invention may be either in the alcohol or ester form. The vitamins may be derived from natural sources or synthetically prepared. The compositions may also contain desired amounts of other vitamins either from natural sources or synthetically prepared. In general, vitamin D will be included in the compositions in relatively smaller amounts than vitamin A and will be solubilized along with vitamin A by the method of the invention.

Illustrative of the water-insoluble, predominantly lipophilic, non-ionic surfactants which are useful in practicing the invention are long chain fatty acid diesters of polyethylene glycol, in which the molecular weight of the glycol moiety may be within the range or presently available diesters, that is, from 200 to 4000. The diesters of polyethylene glycols of lower molecular weights are more effective per unit weight. Other useful surfactants are long chain fatty alcohols, such as decyl and lauryl alcohol, long chain fatty esters of sorbitan such as the monolaurate ("Span 20") and the monooleate ("Span 80"), long chain fatty acid esters of glycerol, such as the monooleate and monostearate, and long chain fatty acid esters of propyleneglycol such as the monolaurate.

The compositions of the invention may be prepared by admixing the lipoid soluble vitamins with the solubilizing components of the composition, preferably with warming, to obtain a clear homogeneous solution. The compositions thus prepared may be stored or marketed for the preparation of clear aqueous solutions or the aqueous solutions may be made immediately by mixing the compositions with sufficient water to give the desired final concentration of vitamin. The water may contain water-miscible substances, such as ethanol, glycerol or propylene glycol commonly used in pharmaceutical preparations. 40% aqueous solutions of glycerol are particularly useful as diluents for the compositions of the invention. The final compositions may contain any of the water-soluble vitamins in the desired proportions as well as preservatives, antioxidants, buffers, metal sequestering agents and such other additives as may be desired. The added substances may be mixed with the water-soluble compositions before they are diluted or they may be added to the water or the aqueous solutions used for dilution.

Commercially available polyethyleneglycol fatty acid esters are mixtures of mono- and di-ester and free glycol. Typical commercial polyethyleneglycol 400 oleates, coconates and laurates have been found to have a diester content of the order of 25 to 30 percent and a ratio of di- to mono-esters of about 6 to 10.

I have found that the mono- and di-fatty acid esters may be separated in substantially pure form from the commercial polyethylene glycol ester products or the diester content of the commercial products substantially reduced by treatment of the commercial esters with low boiling aliphatic hydrocarbons, such as petroleum ether. The ratio of volume of petroleum ether to volume of ester must exceed about 2–3 to one in order to obtain separation into layers. For efficient extraction the ratio should be at least ten volumes to one at room temperature and 8–9 volumes to one at about 15° C. Higher ratios give little further improvement in yield and increase the expense of solvent recovery. The yield is considerably improved when the extraction is effected at about 15° C. but lower temperatures are not feasible since the ester crystallizes out.

Examples A–G are illustrative of methods of obtaining polyethylene glycol ester products suitable for use in the compositions of the invention by the extraction of commercially available polyethylene glycol esters.

Examples 1–14 are illustrative of the water-miscible vitamin concentrates of the invention and their method of production.

Examples 15–16 are illustrative of aqueous mixed vitamin compositions of the invention.

Example A

Pure polyethylene glycol 400 monococonate is prepared from a commercial polyethylene glycol 400 coconate as follows: One volume of crude ester is extracted with 10 volumes of 30–60° C. petroleum ether by stirring mechanically for 10 minutes, allowing to settle and separating the layers in a separatory funnel. The upper petroleum ether layer on evaporation yields 41 percent by weight of the original material and is set aside for diester recovery as described in Example B. The lower layer is extracted again, this time using only 6⅓ volumes of petroleum ether, to allow for the dissolved solvent. The loss at this step is 16 percent. A third extraction using 7⅓ volumes of petroleum ether (again allowing for dissolved solvent) is carried out resulting in 11 percent loss. Without evaporating the solvent, the triply extracted material is now treated as follows to remove glycols: Three volumes is diluted with 2 volumes of ethyl acetate, stirred 10 minutes with 2 volumes of 25 percent sodium chloride solution and the layers separated. Evaporation of ethyl acetate and petroleum ether from the upper layer leaves a turbid liquid which is dissolved in 400 cc. of ether, dried over calcium sulfate, filtered and re-evaporated on the steam bath at 100° C. and 18 mm. pressure. The yield of pure monoester thus obtained is 27 percent of the original crude material.

Analysis based on an average molecular weight of polyethylene glycol monococonate of 610 showed:

| | Milliequivalents per gm. |
|---|---|
| Hydroxyl calculated | 1.64 |
| Found | {1.56<br>{1.64 |
| Saponification calculated | 1.64 |
| Found | {1.59<br>{1.62 |

Saponification procedure: As in United States Pharmacopoeia XV, p. 897.

Hydroxyl assay: As in National Formulary X, pp. 454–5, modified by using 10 cc. of phthalic anhydride reagent instead of 25 cc., and reducing the sodium hydroxide concentration from 0.5 to 0.2 N.

Free fatty acid: The sample is dissolved in 70 percent ethanol and titrated with 0.2 N sodium hydroxide to phenolphthalein end point.

Example B

One volume of crude polyethylene glycol 400 coconate is extracted with 10 volumes of 30–60° C. petroleum ether by stirring mechanically for 10 minutes, allowing to settle and separating the layers in a separatory funnel. The lower layer is used for preparing pure monoester as in Example A. The solvent is evaporated from the upper layer which is then treated as follows: One volume is dissolved in one volume of ethyl acetate and extracted by stirring for 10 minutes with one volume of water, separating the ethyl acetate layer and evaporating the solvent. One volume of this product is dissolved in 5 volumes of petroleum ether (30–60° C.) and stirred with 5 volumes of water. Several hours are required for the separation, and the layers are not clear. The petroleum ether layer is extracted with 3 volumes of saturated sodium chloride solution, separated, evaporated and filtered. The yield is about 35 percent. This process removes free glycol and the product is used as a source of diester by making allowance for the monoester content.

Analysis based on an average molecular weight of 610 for the monococonate and 820 for the dicoconate gave:

Milliequivalents per gm.
Hydroxyl found _____ 0.64
Saponification found _____ 2.24

This corresponds approximately to

Percent
Monococonate _____ 37
Dicoconate _____ 63

Example C

A commercial poyethylene glycol 400 coconate was treated as follows to lower the diester content and render the product water soluble and useful for vitamin solubilization: The commercial ester was stirred for about 10 minutes with 10 volumes of 30–60° C. petroleum ether, the lower layer separated, and dissolved solvent evaporated at 100° C. and to 18 mm. pressure. The yield was 60 percent.

The product was analysed as follows: A 25 gm. sample was dissolved in 100 cc. of ethyl acetate and extracted 3 times with 25 cc. portions of 15% aqueous sodium sulfate solution. The aqueous extracts were combined and diluted to 100 cc. Two 25 cc. aliquots were taken, one for titration for free fatty acid content and one was evaporated to dryness on the steam bath and saponified as described under Example A.

The ethyl acetate layer was evaporated to dryness on the steam bath and transferred with 25 cc. of benzene to a fritted glass filter to remove sodium sulfate. The filtrate was then evaporated in a tared flask on the steam bath under water pump vacuum until all benzene was removed. The residue was weighed and hydroxyl and free fatty acid determinations were carried out as described under Example A. The weight of the residue from the ethyl acetate layer is subtracted from the weight of the sample to give the weight of the fraction in the aqueous layer. The aqueous fraction contains a mixture of all of the glycol with part of the monoester while the ethyl acetate fraction contains a mixture of all of the diester with the rest of the monoester. A sponification determination on the former together with an hydroxyl determination on the latter is sufficient to enable the composition of the original commercial polyethylene glycol 400 coconate to be computed. A correction is made in each case for free fatty acid content.

A typical commercial polyethylene glycol 400 coconate had the following composition:

|  | Crude coconate | After extraction with petroleum ether |
|---|---|---|
| Glycol | 19.7 | 29.0 |
| Monococonate | 51.0 | 57.8 |
| Dicoconate | 29.4 | 13.2 |

Example D

A commercial polyethylene glycol 400 laurate was treated as in Example C to obtain a 64% yield. The product had the following composition:

|  | Crude laurate | After extraction with petroleum ether |
|---|---|---|
| Glycol | 17.2 | 26.5 |
| Monolaurate | 52.6 | 57.9 |
| Dilaurate | 30.3 | 15.6 |

Example E

A commercial polyethylene glycol 400 oleate was extracted with 10 volumes of 30–60° C. petroleum ether. The lower layer was separated and extracted a second time with 5 volumes of petroleum ether, separated and solvent evaporated at 100° C. to 18 mm. pressure. The yield was 43% and the product had the following composition:

|  | Crude oleate | After extraction with petroleum ether |
|---|---|---|
| Glycol | 19.6 | 41.4 |
| Monooleate | 53.6 | 53.9 |
| Dioleate | 26.8 | 4.7 |

Example F

A commercial polyethylene glycol 400 coconate was extracted with petroleum ether (30–60° C.) in a continuous liquid-liquid extractor operating at a flow rate of roughly 500 cc. per hour. After 11 hours the lower layer was separated and evaporated on the steam bath at water pump vacuum to remove dissolved solvent. The product was dissolved in 1⅓ volumes of benzene and stirred for 10 minutes with an equal amount of 25% aqueous sodium chloride solution. The aqueous phase was discarded and the extraction repeated once. The organic layer was then extracted with ⅔ volume of saturated sodium chloride solution. The benzene layer was dried over anhydrous calcium sulfate, filtered and solvent evaporated on the steam bath to 1 mm. pressure. The yield was 24%. The product has the following composition:

Percent
Monococonate _____ 79.3
Dicoconate _____ 15.6

Example G

A commercial polyethylene glycol 400 coconate was treated as in Example F. The yield was 30% and the composition of the product was:

Percent
Monococonate _____ 86.2
Dicoconate _____ 11.4

Example 1

One part of commercial vitamin A palmitate (1.8 million units per gm.) was mixed with 15 parts of polyethylene glycol 400 monococonate prepared as in Example A and 2.11 parts of polyethylene glycol 400 dicoconate prepared as in Example B to give a concentrate having a potency of 100,000 units per gm. dilutable in water and 40% glycerol to give clean stable solutions.

*Example 2*

One part of commercial vitamin A palmitate (1.8 million units per gm.) was mixed with 6.26 parts of polyethylene glycol 400 monococonate prepared as in Example A and 1.20 parts of polyethylene glycol 400 dicoconate prepared as in Example B to give a concentrate having a potency of 210,000 units per gm. dilutable in 40% glycerol to give clear stable solutions.

*Example 3*

One part of commercial vitamin A palmitate (1.8 million units per gm.) was mixed with 5.79 parts of polyethylene glycol 400 monococonate prepared as in Example A and 2.57 parts of polyethylene glycol 400 dicoconate prepared as in Example B to give a concentrate having a potency of 190,000 units per gm. dilutable in water to give clear stable solutions.

*Example 4*

One part of commercial vitamin A palmitate (one million units per gm.) was mixed with 6 parts of commercial polyethylene glycol 400 coconate and 3 parts of the extracted ester of the compositions given in Example C to give a concentrate having a potency of 100,000 units per gm. dilutable with water to give clear stable solutions.

*Example 5*

One part of commercial vitamin A palmitate (one million units per gm.) was mixed with 6 parts of commercial polyethylene glycol 400 laurate and 3 parts of the extracted ester of the compositions given in Example D to give a concentrate having a potency of 100,000 units per gm. dilutable with 40% glycerol to give clear stable solutions.

*Example 6*

One part of commercial vitamin A palmitate (one million units per gm.) was mixed with 1.5 parts of commercial polyethylene glycol 400 oleate and 7.5 parts of the extracted ester of the compositions given in Example E to give a concentrate having a potency of 100,000 units per gm. dilutable with water to give clear stable solutions.

*Example 7*

One part of commercial vitamin A palmitate (1.8 million units per gm.) was mixed with 7.17 parts of extracted polyethylene glycol 400 oleate prepared as in Example E to give a concentrate having a potency of 220,000 units per gm. dilutable with water and 40% glycerol to give clear stable solutions.

*Example 8*

| | Parts |
|---|---|
| Commercial vitamin A palmitate (1.8 million units per gm. | 1 |
| Polyethylene glycol 400 monococonate prepared as in Example A | 14.3 |
| Propylene glycol monolaurate | 2.57 |

Potency: 100,000 units per gm.
Dilutable with water.

*Example 9*

| | |
|---|---|
| Commercial vitamin A palmitate (1.8 million units per gm.) | 1 |
| Polyethylene glycol 400 monococonate prepared as in Example A | 14.3 |
| Sorbitan monooleate | 2.57 |

Potency: 100,000 units per gm.
Dilutable with 40% glycerol.

*Example 10*

| | |
|---|---|
| Commercial vitamin A palmitate (1.8 million units per gm.) | 1 |
| Polyethylene glycol 400 monococonate prepared as in Example A | 14.3 |
| Glycerol monooleate | 2.57 |

Potency: 100,000 units per gm.
Dilutable with water.

*Example 11*

| | |
|---|---|
| Commercial vitamin A palmitate (1.8 million units per gm.) | 1 |
| Polyethylene glycol 400 monococonate prepared as in Example A | 15.4 |
| Lauryl alcohol | 1.43 |

Potency: 100,000 units per gm.
Dilutable with water.

*Example 12*

| | |
|---|---|
| Commercial vitamin A palmitate (one million units per gm.) | 1 |
| Polyethylene glycol 400 coconate extracted as in Example F | 7.4 |
| Sorbitan monolaurate | 1.6 |

Potency: 100,000 units per gm.
Dilutable with water.

*Example 13*

| | |
|---|---|
| Commercial vitamin A palmitate (one million units per gm.) | 1 |
| Polyethylene glycol 400 coconate extracted as in Example F | 7.4 |
| Sorbitan monooleate | 1.6 |

Potency: 100,000 units per gm.
Dilutable with water.

*Example 14*

| | |
|---|---|
| Commercial vitamin A palmitate (one million units per gm.) | 1 |
| Polyethylene glycol 400 coconate extracted as in Example F | 8 |
| Lauryl alcohol | 1.0 |

Potency: 100,000 units per gm.
Dilutable with water.

*Example 15*

A water soluble concentrate of the lipoid soluble vitamins A and $D_2$ was prepared with the following composition:

| | Parts |
|---|---|
| Commercial vitamin A palmitate (one million units per gm.) | 1 |
| Vitamin $D_2$ | 0.0005 |
| Polyethylene glycol 400 coconate extracted as in Example G | 7.4 |
| Sorbitan monolaurate | 1.6 |

Potency:
  100,000 units per gm. vitamin A.
  20,000 units per gm. vitamin $D_2$.

The ingredients mixed readily to give a clear orange free flowing oil. This concentrate was then converted into a multivitamin preparation with the following formula:

| | Amount in 0.6 cc. |
|---|---|
| Vitamin A concentrate | 50.0 mg. (5,000 units). |
| Vitamin $D_2$ | 1,000 units. |
| Vitamin $B_1$ | 2.0 mg. |
| Vitamin $B_2$ | 0.5 mg. |
| Vitamin $B_6$ | 1.0 mg. |
| Vitamin C | 60.0 mg. |
| Pantothenyl alcohol | 3.0 mg. |
| Niacinamide | 20.0 mg. | by dilution with 20% aqueous glycerol solution containing 0.2% sodium benzoate as preservative and adding suitable proportions of the other vitamins. The product is a clear solution which is stable at room temperature and 37° C.

*Example 16*

A water soluble concentrate of the lipoid soluble vitamins A and $D_2$ was prepared with the following composition:

| | Parts |
|---|---|
| Commercial vitamin A palmitate (one million units per gm.) | 1 |
| Vitamin $D_2$ | 0.0005 |
| Polyethylene glycol 400 coconate extracted as in Example C | 9 |

Potency:
 100,000 units per gm. vitamin A.
 20,000 units per gm. vitamin $D_2$.

The ingredients mixed readily to give a clear orange free flowing oil. This concentrate was then converted into a multivitamin preparation with the following formula:

| | Amount in 0.6 cc. |
|---|---|
| Vitamin A concentrate | 50.0 mg. (5,000 units). |
| Vitamin $D_2$ | 1,000 units. |
| Vitamin $B_1$ | 2.0 mg. |
| Vitamin $B_2$ | 0.5 mg. |
| Vitamin $B_6$ | 1.0 mg. |
| Vitamin C | 60.0 mg. |
| Pantothenyl alcohol | 3.0 mg. |
| Niacinamide | 20.0 mg. | by dilution with 40% aqueous glycerol solution containing 0.2% sodium benzoate as a preservative and adding suitable proportions of the other vitamins. The product is a clear solution which is stable at room temperature and 37° C.

I claim:

1. A method of making vitamin compositions containing a lipoid soluble vitamin and miscible with water and aqueous glycerol to form clear, stable aqueous solutions which comprises admixing with a lipoid soluble vitamin at least 6 parts by weight to each part of the vitamin of a mixture of a monoester of a polyethylene glycol, the glycol moiety of which has a molecular weight of about 400, selected from the group consisting of the laurate, coconate and oleate esters, and a water-insoluble, predominantly lipophilic, non-ionic surfactant selected from the group consisting of long chain fatty diesters of polyethylene glycol, long chain fatty alcohols, and long chain fatty acid monoesters of sorbitan, glycerol, and propylene glycol in the range of from about ½ part to 5 parts by weight of the surfactant to 10 parts of the polyethylene glycol monoester.

2. A method of making vitamin compositions containing vitamin A and miscible with water and aqueous glycerol to form clear, stable aqueous solutions which comprises admixing with a fatty acid ester of vitamin A at least 6 parts by weight to each part of the vitamin of a mixture of a monoester of a polyethylene glycol, the glycol moiety of which has a molecular weight of about 400, selected from the group consisting of the laurate, coconate and oleate esters, and a water-insoluble, predominantly liophilic, non-ionic surfactant selected from the group consisting of long chain fatty diesters of polyethylene glycol, long chain fatty alcohols, and long chain fatty acid monoesters of sorbitan, glycerol, and propylene glycol in the range of from about ½ part to 5 parts by weight of the surfactant to 10 parts of the polyethylene glycol monoester.

3. A method as defined in claim 2 wherein the surfactant is the corresponding diester of said polyethylene glycol.

4. A lipoid soluble vitamin composition miscible with water and aqueous glycerol to form clear, stable, aqueous solutions comprising a lipoid soluble vitamin and at least 6 parts by weight to each part of the vitamin of a mixture of a monoester of a polyethylene glycol, the glycol moiety of which has a molecular weight of about 400, selected from the group consisting of the laurate, coconate and oleate esters, and a water-insoluble, predominantly lipophilic, nonionic surfactant selected from the group consisting of long chain fatty diesters of polyethylene glycol, long chain fatty alcohols, and long chain fatty acid monoesters of sorbitan, glycerol, and propylene glycol in the range of from about ½ part to 5 parts by weight of the surfactant to 10 parts of the polyethylene glycol monoester.

5. A vitamin A composition miscible with water and aqueous glycerol to form clear, stable, aqueous solutions comprising a fatty acid ester of vitamin A and at least 6 parts by weight to each part of the vitamin of a mixture of a monoester of a polyethylene glycol, the glycol moiety of which has a molecular weight of about 400, selected from the group consisting of the laurate, coconate and oleate esters, and a water-insoluble, predominantly lipophilic, non-ionic surfactant selected from the group consisting of long chain fatty diesters of polyethylene glycol, long chain fatty alcohols, and long chain fatty acid monoesters of sorbitan, glycerol, and propylene glycol in the range of from about ½ part to 5 parts by weight of the surfactant to 10 parts of the polyethylene glycol monoester.

6. A composition as defined in claim 5 wherein the surfactant is the corresponding diester of said polyethylene glycol.

7. A clear stable essentially aqueous vitamin composition containing a lipoid soluble vitamin and at least 6 parts by weight to each part of the vitamin of a mixture of a monoester of a polyethylene glycol, the glycol moiety of which has a molecular weight of about 400, selected from the group consisting of the laurate, coconate and oleate esters, and a water-insoluble, predominantly lipophilic, non-ionic surfactant in the range of from about ½ part to 5 parts by weight of the surfactant to 10 parts of the polyethylene glycol monoester.

8. A clear stable essentially aqueous vitamin composition containing a fatty acid ester of vitamin A and at least 6 parts by weight to each part of the vitamin of a mixture of a monoester of a polyethylene glycol, the glycol moiety of which has a molecular weight of about 400, selected from the group consisting of the laurate, coconate and oleate esters, and a water-insoluble, predominantly lipophilic, non-ionic surfactant selected from the group consisting of long chain fatty diesters of polyethylene glycol, long chain fatty alcohols, and long chain fatty acid monoesters of sorbitan, glycerol, and propylene glycol in the range of from about ½ part to 5 parts by weight of the surfactant to 10 parts of the polyethylene glycol monoester.

9. A composition as defined in claim 8 wherein the surfactant is the corresponding diester of said polyethylene glycol.

References Cited in the file of this patent

UNITED STATES PATENTS

| 2,421,598 | Buxton | June 3, 1947 |
| 2,463,738 | Bernhart | Mar. 8, 1949 |
| 2,469,446 | Strauss | May 10, 1949 |
| 2,518,230 | Freedman | Aug. 8, 1950 |
| 2,541,285 | Rawlins | Feb. 13, 1951 |
| 2,583,576 | Kern | Jan. 29, 1952 |
| 2,655,522 | Malkemus | Oct. 13, 1953 |
| 2,953,496 | Phillips | Sept. 20, 1960 |

OTHER REFERENCES

McCutcheon: Synthetic Detergents up to Date, II, Soaps and Sanitary Chemicals, 28:8, August 1952, pages 59 and 62.

(Other references on following page)

OTHER REFERENCES

McCutcheon: Surfactants Listed. Soap and Chemical Specialties 34:2. February 1958, pages 54, 57, 62, 66 and 70.

Remington's Practice of Pharmacy, eleventh ed., February 1956, Mack Pub. Co., Easton, Pa., pages 190 and 191.

Mima et al.: J. Pharm. Soc. of Japan, vol. 77, November 1957, pages 1201–1203.

Mima et al.: J. Pharm. Soc. of Japan, vol. 78, 1958, pages 381–386.

UNITED STATES PATENT OFFICE
CERTIFICATE OF CORRECTION

Patent No. 3,036,957                                                May 29, 1962

Robert A. Lehman

It is hereby certified that error appears in the above numbered patent requiring correction and that the said Letters Patent should read as corrected below.

Column 8, line 36, after "surfactant" insert -- selected from the group consisting of long chain fatty diesters of polyethylene glycol, long chain fatty alcohols, and long chain fatty acid monoesters of sorbitan, glycerol, and propylene glycol --.

Signed and sealed this 18th day of September 1962.

(SEAL)
Attest:

ERNEST W. SWIDER                                  DAVID L. LADD
Attesting Officer                                     Commissioner of Patents